United States Patent [19]

Tsunoda et al.

[11] Patent Number: 4,807,055
[45] Date of Patent: Feb. 21, 1989

[54] MULTI-SPEED MAGNETIC RECORDING PLAYBACK

[75] Inventors: Taiji Tsunoda; Takashi Iwasawa, both of Saitama, Japan

[73] Assignee: Pioneer Electronic Corporation, Tokyo, Japan

[21] Appl. No.: 906,006

[22] Filed: Sep. 11, 1986

[30] Foreign Application Priority Data

Sep. 11, 1985 [JP] Japan .................................. 60-201996
Oct. 2, 1985 [JP] Japan .................................. 60-219878

[51] Int. Cl.⁴ .............................................. G11B 5/08
[52] U.S. Cl. ........................................ 360/32; 360/48
[58] Field of Search ................ 360/32, 48, 8, 18, 19.1, 360/70, 75

[56] References Cited

U.S. PATENT DOCUMENTS 4,392,161 7/1983 Ota et al. ................................. 360/8
4,689,697 8/1987 Wilkinson ........................... 360/19.1

Primary Examiner—Vincent P. Canney
Assistant Examiner—Kevin J. Fournier
Attorney, Agent, or Firm—Sughrue, Mion, Zinn, Macpeak & Seas

[57] ABSTRACT

A magnetic recording playback system compatible with both an 8 mm video format and a rotary head digital audio tape form. A rotary head records tilted tracks on the tape. Each track is divided into four areas which are recorded with different types of audio signals. The signals may also be divided between adjacent tracks. Each area has its own control information. Different sampling rates are used for the two different formats.

11 Claims, 4 Drawing Sheets

FIG. 2
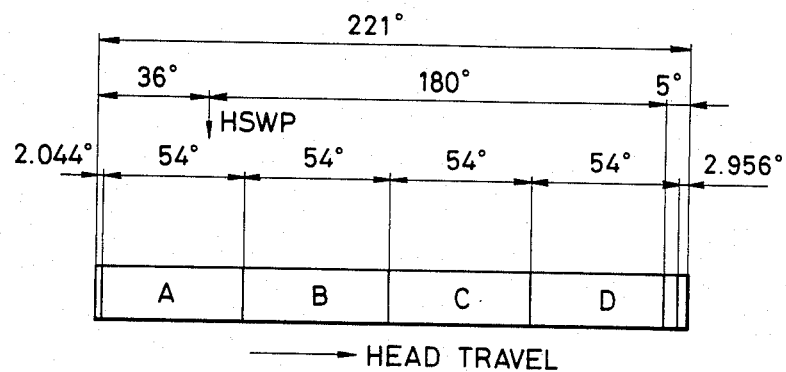
HEAD TRAVEL
FIG. 3
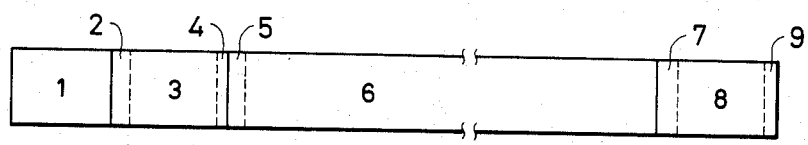
FIG. 4
PRIOR ART

MULTI-SPEED MAGNETIC RECORDING PLAYBACK

BACKGROUND OF THE INVENTION

1. Field of the Invention

This invention relates to a magnetic recording playback such as a video tape recorder for recording and playing back information using rotary magnetic heads.

2. Background Art

Recently, so-called 8 mm video tape recorders have been standarized and put on the market. In a 8 mm video tape recorder of that sort, the rotational diameter of a rotary magnetic head (the diameter of a rotary drum) is set at 40 mm and an angle at which a magnetic tape is wound on the rotary drum is set at 221 degrees. Video signals are recorded in a portion corresponding to the 180-degree winding angle, whereas PCM (pulse code modulation) audio signals are recorded in a portion corresponding to the 36-degree winding angle. The portion corresponding to the remaining 5-degree winding angle is left as a surplus area. The portion corresponding to the 36-degree winding angle is further divided into a portion a for use in recording clock signals, a portion b for use in recording data such as the PCM audio signals, a margin c for after-recording, and a video overlap for use in continuously recording video signals of the immediately preceding field. Moreover, tracking pilot signals $f_1$, $f_2$, $f_3$, $f_4$ are sequentially recorded in the whole portion corresponding to the 221-degree winding angle on a track by track basis. These pilot signals $f_1$, $f_2$, $f_3$, $f_4$ are treated as signals at frequencies of $f_H/58$, $f_H/50$, $f_H/36$, $f_H/40$, where $f_H$ is the horizontal synchronizing signal. A tracking error signal is formed from stroke components derived from the tracks on the left and right of the pilot signals continuously recorded on each track. The number of revolutions of the rotary magnetic head is set at 1,800 rpm in the NTSC system and 1,500 rpm in the PAL system since it is operated so as to record video signals. Furthermore, a plurality of portions (five portions) corresponding to the 36-degree winding angle are formed in the portion corresponding to the 180-degree winding angle so that only audio signals may be recorded therein.

The audio signal recorded in the 36-degree portion is so arranged as to have a sampling frequency of 2 $f_H$ (roughly 31.5 kHz), 10 quantizing bits, and 2 channels. However, the 10-bit data is converted (compressed) into an 8-bit data before being recorded on the magnetic tape.

On the other hand, the R-DAT (rotational head digital audio tape) system has recently been standardized in order to record and play back high-definition audio signals. The R-DAT has adopted a standard comprising a magnetic tape winding angle of 90 degrees, a rotary drum diameter of 30 mm, a sampling frequency of 48 kHz, 44.1 kHz or 32 kHz, 16 quantizing bits, and 2 channels.

The track corresponding to a 90-degree winding angle is, as shown in FIG. 4, divided into 16 portions and data shown in Table 1 is recorded in each portion. In this case, one block is composed of 288-bit data and the 8-bit data is converted (modulated) into 10-bit data before being recorded on the magnetic tape.

The frequency $f_{ch}$ represents a clock signal of 9.408 MHz.

As shown in Table 1, the data comprises (1) a subcode signal recording portion consisting of 2, 3, 4, (2) a tracking signal recording portion of 5, 6, 7, (3) a PCM audio signal recording portion of 8, 9, (4) a tracking signal recording portion of 10, 11, 12 and (5) a subcode recording portion of 13, 14, 15.

TABLE 1

| | Signal | Angle (degree) | Number of blocks | Frequency (microseconds) |
|---|---|---|---|---|
| 1 MARGIN | ½ $f_{ch}$ | 5.051 | 11 | 420.9 |
| 2 PLL | ½ $f_{ch}$ | 0.918 | 2 | 76.5 |
| 3 SUB-1 | | 3.673 | 8 | 306.1 |
| 4 POST AMBLE | ½ $f_{ch}$ | 0.459 | 1 | 38.3 |
| 5 IBG | 1/6 $f_{ch}$ | 1.378 | 3 | 114.8 |
| 6 ATF | | 2.296 | 5 | 191.3 |
| 7 IBG | 1/6 $f_{ch}$ | 1.378 | 3 | 114.8 |
| 8 PLL (PCM) | ½ $f_{ch}$ | 0.918 | 2 | 76.5 |
| 9 PCM | | 58.776 | 128 | 4898.0 |
| 10 IBG | 1/6 $f_{ch}$ | 1.378 | 3 | 114.8 |
| 11 ATF | | 2.296 | 5 | 191.3 |
| 12 IBG | 1/6 $f_{ch}$ | 1.378 | 3 | 114.8 |
| 13 PLL (SUB) | ½ $f_{ch}$ | 0.918 | 2 | 76.5 |
| 14 SUB-2 | | 3.673 | 8 | 306.1 |
| 15 POST AMBLE | ½ $f_{ch}$ | 0.459 | 1 | 38.3 |
| 16 MARGIN | ½ $f_{ch}$ | 5.051 | 11 | 420.9 |
| TOTAL | | 90.000 | 196 | 7500.0 |

There are two systems for recording and playing back digital audio signals on a magnetic tape using a rotary magnetic head. However, since the 8 mm video tape recorder is mainly designed to record video signals, its audio signal sampling frequency is low besides the sound quality is inferior to what is offered by the R-DAT. On the other hand, the R-DAT is disadvantageous in that it is incapable of recording and playing back video signals but can only play back audio signals.

There are two systems for recording and playing back digital audio signals on a magnetic tape using a rotary magnetic head. However, the sound quality is determined by the sampling frequency. The low sampling frequency device has failed to realize what is accomplished by the high sampling frequency device. Also, since the 8 mm video tape recorder is mainly designed to record video signals, its audio signal sampling frequency is low and besides the sound quality is inferior to what is offered by the R-DAT. In addition to the above disadvantage, the problem is that a 4-channel audio signal cannot be efficiently recorded and played back.

SUMMARY OF THE INVENTION

An object of this invention is to provide a rotary-head magnetic recording playback compatible with both 8 mm video tape recording and R-DAT recording.

The magnetic recording playback of the invention is characterized in that a track is formed by rotary magnetic heads in such a manner as to be tilted in the longitudinal direction of a magnetic tape. The track is divided into a plurality of areas and analog signals are sampled at a clock rate of substantially a frequency Nf and data are sampled every Nth clock pulses from the corresponding area as a group. Accordingly, the magnetic playback operates with higher frequency clocks which allows not only the enjoyment of high quality audio signals but also the playback of the recorded signals is operated with lower frequency clocks by means of such a device.

BRIEF DESCRIPTION OF THE DRAWINGS

FIG. 2 is a typical plan view of the track therein.

FIG. 3 is a typical plan view of the areas.

FIG. 4 is a typical plan view of the track in a conventional magnetic recording playback.

DETAILED DESCRIPTION OF THE PREFERRED EMBODIMENTS

Figure 1:
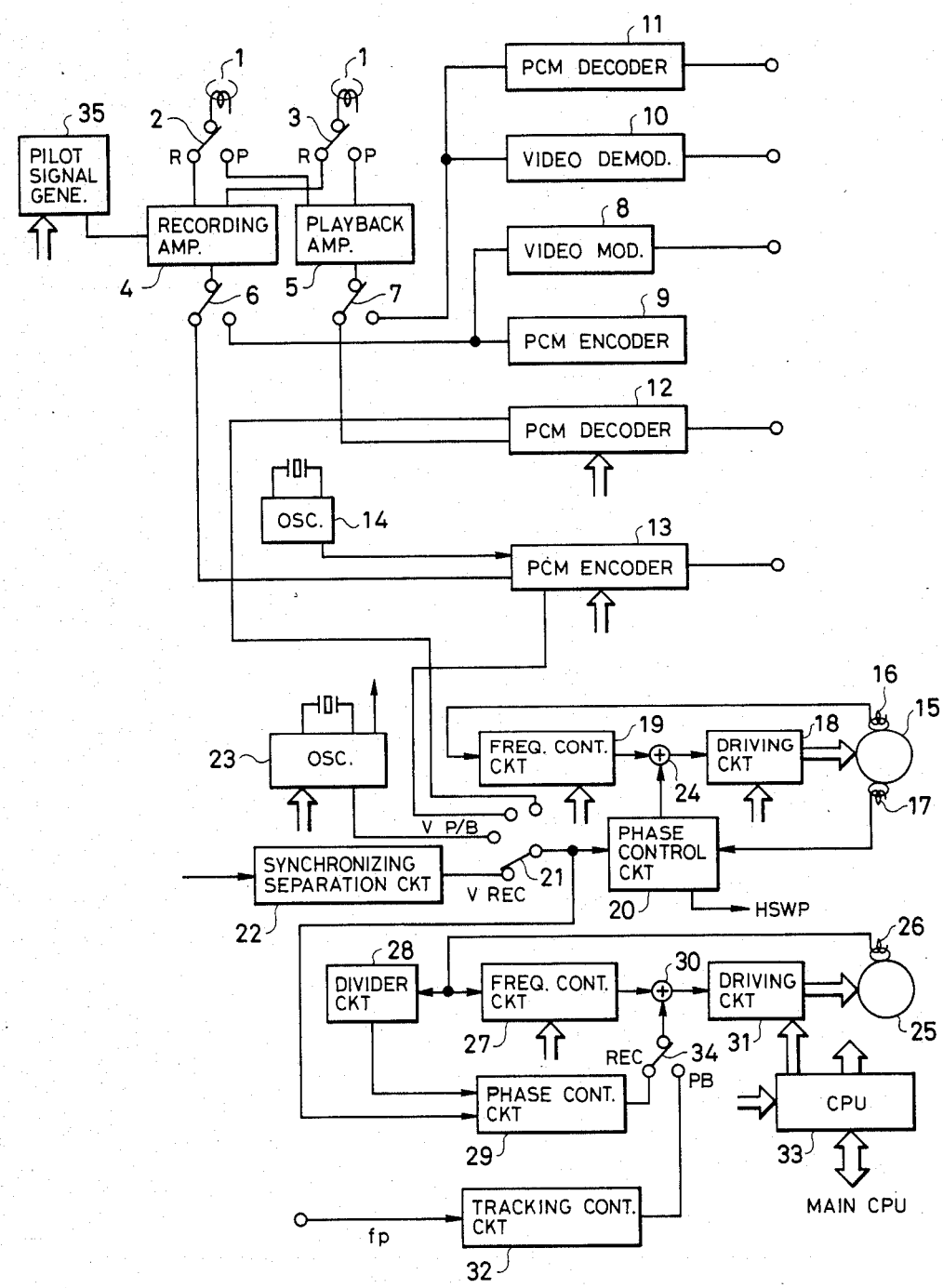
FIG. 1 is a block diagram of a magnetic recording playback embodying the present invention.

FIG. 1 is a block diagram of a magnetic recording playback (8 mm video tape recorder) embodying the present invention. As shown in FIG. 1, two rotary magnetic heads 1 are attached to a rotary drum (not shown) at positions 180 degrees apart from each other. A signal is alternately supplied from a recording amplifier 4 to the rotary magnetic heads 1 through switches 2 and 3, whereas signals are respectively supplied from the rotary magnetic heads 1 to a playback amplifier 5 through the switches 2 and 3. Signals are respectively supplied from a video modulator 8 and a PCM encoder 9 to the recording amplifier 4 through a switch 6 and a pilot signal produced by a pilot signal generator 35 is also supplied thereto. A signal from the playback amplifier 5 is supplied to a video demodulator 10 and a PCM decoder 11 through a switch 7. A PCM decoder 12 and a PCM encoder 13 correspond to the formats of the R-DAT and the signal from the playback amplifier 5 is supplied to the PCM decoder 12 through the switch 7, whereas the output of the PCM encoder 13 is supplied to the recording amplifier 4 through the switch 6. An oscillator 14 produces a clock signal $f'_{ch}$, which is supplied to the PCM encoder 13.

A motor 15 used to rotate the rotary drum is equipped with a frequency generator 16 and a pulse generator 17, and is driven by a driving circuit 18. The output of the frequency generator 16 is supplied to a frequency control circuit 19 and compared with a fixed reference signal produced by an oscillation circuit contained therein. The frequency control circuit 19 produces an error signal. A phase control circuit 20 receives, through a switch 21, either (1) a vertical synchronizing signal contained in the recording video signal separated by a synchronizing separator circuit 22, (2) a reference signal produced by an oscillator 23, (3) a reference signal produced by the PCM decoder 12 or (4) a reference signal produced by the PCM encoder 13. The phase control circuit 20 compares a pulse produced by the pulse generator 17 with the reference signal in terms of phase and produces a signal corresponding to the error. The output of the frequency control circuit 19 is added by an adder 24 to the output of the phase control circuit 20 and the sum is supplied to the driving circuit 18.

A motor 25 is used to rotate a capstan (not shown) and is equipped with a frequency generator 26. The output of the frequency generator 26 is supplied to another frequency control circuit 27 and a divider circuit 28. The frequency control circuit 27 compares a fixed reference signal produced by a built-in oscillation circuit with the output of the frequency generator 26 and supplies the divided output to another phase control circuit 29. The second phase control circuit 29 compares the signal from the switch 21 with the signal from the divider circuit 28 and supplies the error signal to the adder 30 through a switch 34. The adder 30 adds the output of the second frequency control circuit 27 to that of the second phase control circuit 29 and supplies the sum to a driving circuit 31, which drives the motor 25 for the capstan. A tracking control circuit 32 separates and extracts a pilot signal $f_p$ from the output of the playback amplifier 5 to form a tracking error signal and supplies the signal to the adder 30 through the switch 34. A CPU (Central Processing Unit) 33 such as a microcomputer controls each circuit, element and switch in combination with the main central processing unit (not shown).

The operation of the magnetic recording playback will now be described. On receiving instructions as to recording a normal video signal and an accompanying PCM audio signal, the CPU 33 sends a control signal to the frequency control circuits 19 and 27, the driving circuits 18 and 31 and so on, causing the motor 15 to rotate the rotary drum at its normal speed (1,800 rpm and 1,500 rpm in the cases of the NTSC and PAL systems, respectively) and causing the motor 25 to rotate the capstan so that the speed of the magnetic tape (not shown) may be set at the normal level. At this time, the frequency control circuit 19 effects servo control so as to make the frequency of the signal produced by the frequency generator 16 equal to that of the contained reference signal. Moreover, the switch 21 is operated so as to choose the output of the synchronizing separator circuit 22, whereby the rotary drum is rotated in such a manner as to be synchronized with the phase of the horizontal synchronizing signal in the video signal to be recorded. The phase control circuit 20 generates a head switching pulse (HSWP) for the switches 2 and 3 as a reference for switching the two rotary magnetic heads and supplies the pulse to each circuit.

The frequency control circuit 27 and the phase control circuit 29 place the motor 25 under frequency and phase servo control. The second phase control circuit 29 supplies an error signal to the adder 30 through the switch 34 with the output of the synchronizing separator circuit 22 at the output of the switch 21 being used as a reference. The error signal represents the difference between the output of the synchronizing separator circuit 22 and that of the divider circuit 28. Consequently, the speed of the magnetic tape is so controlled as to remain at a fixed level (14.345 mm/s and 20.051 mm/s in the NTSC and PAL systems, respectively).

The video signal to be thus recorded is supplied to the video modulator 8 for frequency modulation. Moreover, the audio signal to be recorded is supplied to the PCM encoder 9 and converted into a digital value (PCM). These signals are supplied to the recording amplifier 4 through the switch 6 and then to the rotary magnetic heads 1 through the switches 2 and 3 and are recorded on the magnetic tape. With the head switching pulse generated by the phase control circuit 20 as a reference, the video signal and the audio signal are recorded in the 180-degree video signal recording portion and the 36-degree audio signal recording portion, respectively. Moreover, the tracking pilot signal generated by the pilot signal generator 35 is superposed in terms of frequency on the video signal and on the PCM audio signal and recorded therewith. The then used pilot frequency may be made identical with the pilot signal in the PAL system. It is thus facilitated to separate the clock signal $f'_{ch}$ from the pilot signal.

When the video signal is played back, the output signal (which corresponds to the vertical synchronizing signal) of the oscillator 23 is supplied through the switch 21 to the phase control circuit 20 as a reference signal. The switch 34 is then placed on the tracking control circuit 32 side and the motor 25 is also placed under the phase servo control corresponding to the tracking error signal resulting from the crosstalk component of the pilot signals recorded on the adjoining left and right tracks. The playback signals from the rotary magnetic heads 1 are supplied to the video demodulator 10 and the PCM decoder 11 the switch 17. Accordingly, the video signal recorded in the 180-degree video signal recording portion and the audio signal recorded in the 36-degree audio signal recording portion are demodulated and sent out.

When only a high-fidelity audio signal is to be recorded, the audio signal is supplied to the PCM encoder 13 and converted into a digital value. A PCM encoder similar to what is employed for the so-called R-DAT may be used as the PCM encoder 13. However, the PCM encoder 13 is controlled with a clock and timing different from those applied to the R-DAT.

In other words, one tilted track corresponding in length to the 221-degree winding angle is divided into four areas, each having a length of 54 degrees as shown in FIG. 2, whereas 2.044-degree and 2.956-degree excess portions are provided on the left and right, respectively. The four 54-degree areas A through D are further divided into nine portions and data shown in Table 2 are recorded in each portion.

TABLE 2

| | Signal | Angle (degree) | Number of blocks | Frequency (microseconds) |
|---|---|---|---|---|
| 1 MARGIN | $\frac{1}{4}f'_{ch}$ | 2.956 | 8.8 | 246.268 |
| 2 PLL (SUB) | $\frac{1}{4}f'_{ch}$ | 0.672 | 2 | 55.97 |
| 3 SUB-1 | | 2.687 | 8 | 223.88 |
| 4 POST AMBLE | $\frac{1}{4}f'_{ch}$ | 0.336 | 1 | 27.985 |
| 5 PLL (PCM) | $\frac{1}{4}f'_{ch}$ | 0.672 | 2 | 55.97 |
| 6 PCM | | 42.985 | 128 | 3582.08 |
| 7 PLL (SUB) | $\frac{1}{4}f'_{ch}$ | 0.672 | 2 | 55.97 |
| 8 SUB-2 | | 2.687 | 8 | 223.88 |
| 9 POST AMBLE | $\frac{1}{4}f'_{ch}$ | 0.336 | 1 | 27.985 |
| TOTAL | | 54.0 | 160.8 | 4500.0 |

As is obvious from Table 1, the format according to the present invention excludes the tracking data recording portions 5, 6, 7 and 10, 11, 12 and the last margin 16 in Table 1. The clock $f'_{ch}$ in this case is set at e.g., 12.864 MHz ($=160.8\times288\times(10/8)/0.0045$). The combination is needless to say alterable, provided that the 54-degree winding angle and 4500 microsecond recording time are held. For example, the PLL (PCM) clock recording portion having two blocks may be dispensed with and the margin may have 10.8 instead of 8.8 blocks. Moreover, the surpluses on both sides may be made optional.

It thus becomes possible to record and play back information only by altering the timing but not the coding of the format of the already standardized R-DAT.

The audio signal applied to the PCM encoder 13 is converted into a digital value corresponding to the clock signal $f'_{ch}$ supplied by the oscillator 14 and that timing is controlled by the CPU 33, so that the audio signal is converted into the format signal shown in Table 2. That signal is supplied to the rotary magnetic heads 1 through the switch 6, the recording amplifier 4, and the switches 2 and 3 and thus recorded on the magnetic tape 1. With the head switching pulse supplied by the phase control circuit 20 as a reference, an area pulse corresponding to at least one of the areas A through D is formed and the signal is recorded in the area corresponding to the area pulse.

The frequency control circuit 29 and the driving circuit 18 are so controlled by the CPU 33 as to make the rotary drum rotate at a speed of 2,000 rpm. Moreover, the switch 21 is caused to supply a signal synchronous with the clock $f'_{ch}$ produced by the PCM encoder 13. The clock synchronous signal is supplied to the phase control circuit 20 as a reference signal. The frequency control circuit 27 and the driving circuit 31 are controlled likewise and the speed of the magnetic tape is set at 10.025 mm/s, which is half of the standard speed 20.051 mm/s in the PAL system. The track pitch becomes 13.3 micrometers at that thus set speed. As a result, the width of the rotary magnetic head for standard or one-half speed use in either the NTSC or the PAL system comes within the range of audio and pilot signal recording playback and tracking control by means of the cross-talk component of the pilot signal, thus making it unnecessary to use a rotary magnetic head having a specially arranged width.

When the audio signal thus recorded is played back, the signal from the rotary magnetic head 1 is supplied to the playback amplifier 5 through the switches 2 and 3 and then to the PCM decoder 12 through the switch 7. The PCM decoder 12 is controlled by the CPU 33 and is used to extract the clock signal $f'_{ch}$ from the playback signal and to read out the data in each portion with the clock signal $f'_{ch}$ as a reference. The audio signal is converted into an analog signal and sent out. The tracking pilot signal contained in the playback signal is supplied to the tracking control circuit 32, whereby the tracking error signal is formed. The tracking error signal is supplied to the adder 30 through the switch 34 and used for tracking control. In other words, the tracking signals (ATF) are recorded in the R-DAT in the portions preceding and following the PCM audio signal recording portion as shown in Table 1. The cross-talk component derived from those portions in the left and right tracks are sampled and held at a given timing, so that the tracking error signal is formed from the differential signal. As in the case of an ordinary 8 mm video tape recorder, however, the differential signal of the cross-talk components of the sequentially recorded pilot signals from the left and right tracks is used to form the tracking error signal.

TABLE 3

| Area | | | | | | | | |
|---|---|---|---|---|---|---|---|---|
| D | Re | Re$_2$ | Re$_4$ | Be | Be | Be$_4$ | Be$_4$ | Z |
| | Lo | Lo$_2$ | Lo$_4$ | Fo | Fo | Fo$_4$ | Fo$_4$ | Y |
| C | Re | Re$_2$ | Re$_4$ | Re | Be | Re$_4$ | Be$_4$ | X |
| | Lo | Lo$_2$ | Lo$_4$ | Lo | Fo | Lo$_4$ | Fo$_4$ | W |
| B | Re | Re$_2$ | Re$_4$ | Be | Re | Bo$_4$ | Re$_4$ | V |
| | Lo | Lo$_2$ | Lo$_4$ | Fo | Lo | Fo$_4$ | Lo$_4$ | U |
| A | Re | Re$_2$ | Re$_4$ | Re | Re | Re$_4$ | Re$_4$ | T |
| | Lo | Lo$_2$ | Lo$_4$ | Lo | Lo | Lo$_4$ | Lo$_4$ | S |
| Sampling frequency | 48 | 96 | 192 | 48 | 48 | 96 | 96 | 48 |
| No. of channels | 2 | 2 | 2 | 4 | 4 | 4 | 4 | 8 |
| No. of recording times | 4 | 2 | 1 | 2 | 2 | 1 | 1 | 1 |

The data to be recorded in each area A through D may be formed as shown in Table 3. Given that stereo audio signals L and R (left and right) constitute the recording data with a sampling frequency of 48 kHz and that consecutive numbers are given to the fixed number of data (words) respectively sampled at the clock rate, the odd number left signal (Lo) and the even number right signal (Re) are recorded in the area A, whereas the odd number right signal (Ro) and the even number left signal (Le) are recorded in the area A in the adjoining tracks. That is, the data is interleaved in two tracks as well as being interleaved in each track. Complete data can thus be played back by obtaining the signals from the two tracks. Although there are advantages to using an encoder and a decoder similar to R-DAT encoders and decoders, different ones may be used, which would permit any type of interleaving. As recording is likewise carried out in each of the areas B, C, D, it is possible to record the two channel (L, R) data on one tilted track four times. In Table 3, only the data Lo and Re are listed for convenience, as will be the practice hereafter.

Assuming the sampling frequency is 96 kHz, which is twice as high as the reference frequency of 48 kHz, the data is divided into the even number signals Le and Re and the odd number signals Lo and Ro. Then a new order is applied to the even number signals Le and Re and, in the new order, the same division as in the above case is made. In other words, the odd number signal $Lo_2$ in the new order and the even number signal $Re_2$ are recorded in the area A, whereas the odd number signal $Ro_2$ in the new order the even number signal $Le_2$ are recorded in the adjoining area A. Although a new order is also given to the odd number signals Lo and Ro in the original order and the same process is carried out for them, these signals are recorded in the area B. The resulting signal recorded in each area is substantially the same as what is sampled at 48 kHz and, when it is decoded at the clock rate of 48 kHz, the same audio signal as what had been sampled at 48 kHz can be played back. By this is meant that, if, for example, one sampling data is divided into high and low order bits and respectively recorded in different areas, the above description will become unjustifiable.

Figure 5:
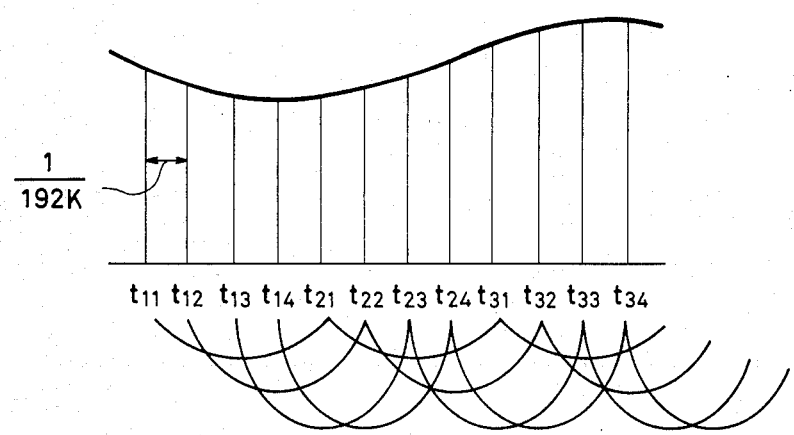
FIGS. 5, 8(a), 8(b) and 8(c) are typical waveform charts showing the sampling states according to the present invention.

Assuming that the sampling frequency is four times as high as the reference frequency, namely 192 kHz, the data is divided into groups on a four sample basis. As shown in FIG. 5, for instance, sampling values $L_{11}$, $R_{11}$ at time $t_{11}$ and sampling values $L_{21}$, $R_{21}$ four clock pulses later, and sampling values $L_{31}$, $R_{31}$ four clock pulses still later are treated as one group. In the same manner, sampling values $L_{12}$, $R_{12}$, $L_{22}$, $R_{22}$, $L_{32}$, $R_{32}$ are treated as a second group; sampling values $L_{13}$, $R_{13}$, $L_{23}$, $R_{23}$, $L_{33}$, $R_{33}$ as a third group and sampling values $L_{14}$, $R_{14}$, $L_{24}$, $R_{24}$, $L_{34}$, $R_{34}$ as a fourth group. Then the same process as described above is carried out so as to record the four groups in the different areas A through D, respectively. New order is given to the first group so that the odd number signal $Lo_4$ and the even number signal $Re_4$ are recorded in the area A; and the odd number signal $Ro_4$ and the even number signal $Le_4$ are recorded in the following area A. In this case, the signal to be recorded in area also becomes substantially equivalent to what is sampled at the clock rate of the reference frequency. Thereby it becomes possible to play back using a decoder at the reference frequency.

If the data is divided into groups on a two sample basis in the same manner, playback using a decoder of a frequency twice as high as the reference frequency becomes possible.

Accordingly, it is obviously preferred that the recording area correspond to a case of lower sampling frequency.

A description will subsequently be given of a case where a 4-channel audio signal is recorded by adding the right and left stereo audio signals (L and R) to, e.g., the front and back audio signals (F and B). In this case, assuming the sampling frequency is the reference frequency of 48 kHz, the left and right stereo signals (L and R) and the corresponding front and back signals (F and B) are recorded in order in the areas A and B, respectively. In principle, the left and right audio signals (L and R) and the front and back audio signals (F and B) may be recorded in one area. However, such simultaneous recording is disadvantageous in a recorder capable of playing back only 2-channel stereo signals (left and right signals (L and R)) because the front and back audio signals recorded in same area cannot be played back. Therefore, the left and right signals (L and R) and the front and back signals (F and B) should preferably be recorded in different respective areas. The left and right signals (L and R) or the front and back signals (F and B) may be recorded in either area. For example, the left and right signals (L and R) may also be recorded in the areas B and A and the front and back signals (F and B) in the areas C and D. In this case, the left and right signals (L and R) and the front and back signals (F and B) may also be recorded in the areas C and D, so that information is recorded on one tilted track twice. In the above case, the odd number signal Lo (Fo) and the even number signal Re (Be) are recorded in each area first and the odd number signal Ro (Bo) and the even number signal Le (Fe) are subsequently recorded in the adjoining area. The area in which the left and right sigals L and R and the front and back signals F and B are recorded can be determined freely. However, the area in which the left and right signals L and R are recorded should preferably correspond to the area in which the 2-channel stereo signals L and R at the sampling frequency of 48 kHz are first recorded or in which the 2-channel stereo signals L and R at the sampling frequency of 96 kHz are either first or subsequently recorded.

When the 4-channel audio signal is sampled at 96 kHz, which is twice as high as the reference frequency, it is first divided into odd number sampling values Lo, Ro, Fo and Bo and even number sampling values Le, Re, Fe and Be. Then a new order is respectively given to the odd number signals Lo, Ro, Fo and Bo and to the even number signals Le, Re, Fe and Be. Of the odd number left and right signals Lo and Ro, the signal $Lo_4$ and the even number signal $Re_4$ in the new order are recorded in the area A. Of the odd number signals Lo and Ro, the odd number signal $Ro_4$ and the even number signal $Le_4$ in the new order are recorded into the subsequent area A. Of the odd number front and back Fo and Bo, the odd number signal $Fo_4$ and the even number signal $Be_4$ in the new order are recorded in the area B and, of the even number signals Fo and Bo, the odd number signal $Bo_4$ and the even number signal $Fe_4$ in the new order are recorded in the subsequent area B. The even number signals Le, Re, Fe, Be are likewise recorded in the areas C and D. In this case, the area in which the left and right signals and the front and back signals are recorded may also be optionally determined. However, such an option should preferably correspond to the cases of 2-channel stereo recording at the reference frequency and 4-channel recording at the reference frequency. That is, the left and right signals L and R sampled at 96 kHz should be recorded in the same area as that where, for example, the left and right signals sampled at 48 kHz should be recorded, whereas the front and back signals F and B sampled at 96 kHz should be recorded in the same area as that where the front and back signals sampled at 48 kHz should be recorded. In so doing, even a recorder having the 48 kHz sampling clock is able to play back a tape recorded with a signal having the 96 kHz sampling rate. In this case, data is recorded in one tilted track once.

Assuming the recording data consists of data S through Z which are independent from each other, 8-channel data can obviously be recorded with 48 kHz sampling.

When the recording wavelength must be made longer, the areas A and B and the areas C and D should each be treated as one area.

As set forth above, the areas A through D have been assumed equivalent. When the two rotary magnetic heads positioned 180-degrees apart from each other are actually used to record and play back data, however, both of them contact the magnetic tape in the area A or D. If one of the rotary heads is used to play back data with the other being used to record data (e.g., for after recording), the data on one side overlaps the one on the other. The increased noise may make it difficult to correctly effect recording playback. When one of the rotary heads is used to play back data with the other being used for recording data, the data in the area B or C which is centrally located should be played back and data should be recorded in the area A or D. When the 4-channel audio signal is recorded at, for example, the reference frequency sampling rate, the left and right signals L and R and the front and back signals F and B should preferably be recorded in the first rotation with, for example, the areas A and D (or B and C) being paired and the left and right signals L and R and the front and back signals F and B should be recorded in the second rotation with the areas B and C (or A and D) being paired.

When the same arrangement as that in the case of the R-DAT is used, 16-bit, 2-channel left and right audio signals are recorded in combination on one track in each of the areas A through D. If the travel direction of the magnetic tape is inverted on an area basis with the areas A and C for use in recording playback in the case of forward transport and, hence, the areas B and D in the case of backward transport, continuous recording playback from the track in each of the four areas will become possible.

Recording playback with the left and right channels being independent of each other is also possible, provided that the areas A and C are used for the left channel and the areas B and D for the right channel.

If the upper and lower order 8-bit data or left and right channel data is played back on an area basis at the twofold sampling frequency rate (96 kHz), a higher-fidelity audio signal can be played back. Furthermore, 4-bit data may be played back from each area at a fourfold sampling frequency. Moreover, 4-channel, 6-channel or 8-channel recording playback are also possible with two, three or four areas respectively being used in combination.

Figure 6:
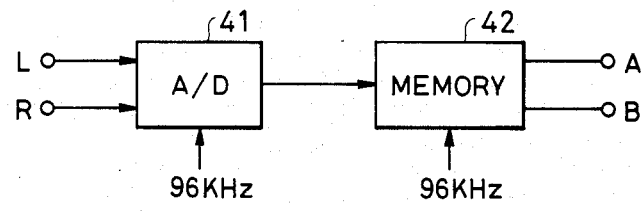
FIGS. 6 and 7 are block diagrams of the PCM encoders thereof.

Now, an embodiment of the PCM encoder 13 will be described. As shown in FIG. 6, the PCM encoder 13 may be composed of an A/D converter 41 and a memory 42. The A/D converter 41 converts the received analog left and right signals L and R into digital signals in accordance with a clock at a fixed frequency (96 kHz according to the embodiment) and causes the memory 42 to store the signals. The signals stored in the memory 42 are read out in accordance with the clock of the same frequency. The sampling frequency of the data recorded in each area will become 48 kHz if the data read out with the odd number clock is recorded in the area A and what is read out with the even number clock in the area B.

Figure 7:
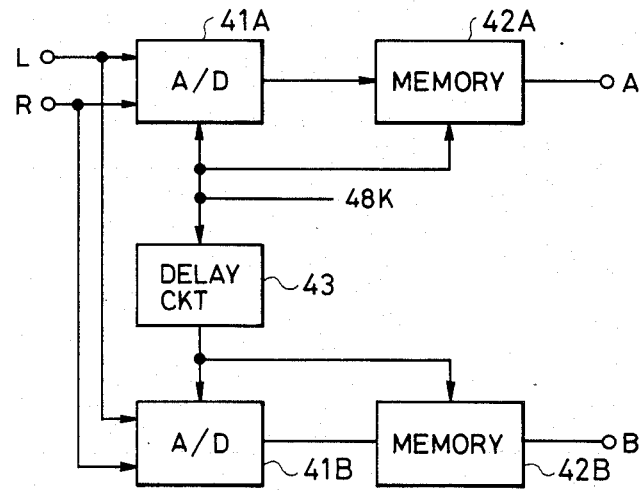
Figure 8A:
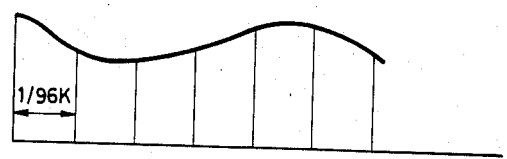
Figure 8B:
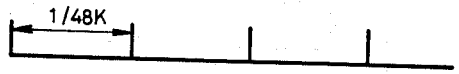
Figure 8C:
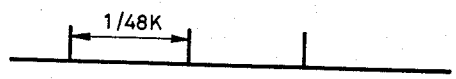

The same effect is accomplished according to an embodiment shown in FIG. 7. In this embodiment, two systems of respective A/D converters 41A and 41B and memories 42A and 42B are actuated by the clock signal at 48 kHz. The clock signal (FIG. 8(b)) at 48 kHz supplied to the A/D converter 14A and the memories 42A is delayed 180-degrees in phase by a delay circuit 43 but is directly supplied to the A/D converter 41A and the memories 42A (FIG. 8(c)). Consequently, e.g., a given analog signal (FIG. 8(c)) is sampled by sampling pulses at 48 kHz, each lagging the other by a phase difference of 180 degrees, and the sampled values are respectively recorded in areas A and B. The original signal becomes practically equivalent to what is sampled at frequency of 96 kHz.

Figure 9:
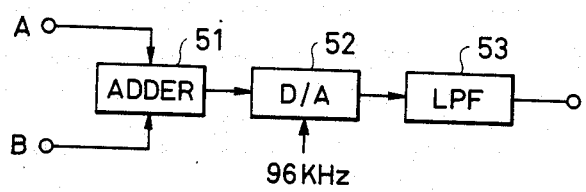
FIGS. 9 and 10 are block diagrams of the PCM decoders thereof.

FIG. 9 shows an embodiment of the PCM decoder for decoding such a signal. In this embodiment, the playback signals (the signals sampled by the 48 kHz clock signals 180-degrees out of phase with each other) from the areas A and B are added in an adder 51 to practically become the signal sampled at 96 kHz before being supplied to a D/A converter 52. In the D/A converter 52 supplied with the 96 kHz clock signal, the digital signal read out in accordance with the clock is smoothed by a low-pass filter 53 and then sent out as an analog signal.

Figure 10:
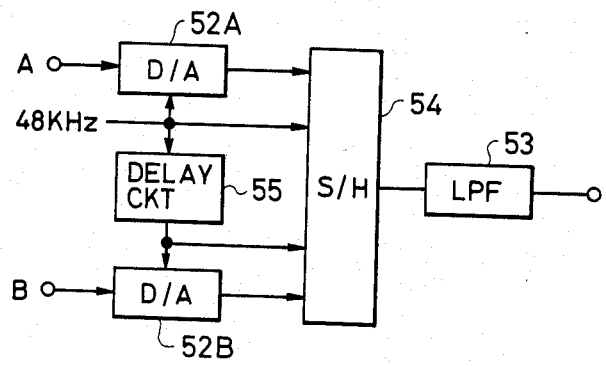
Figure 11:
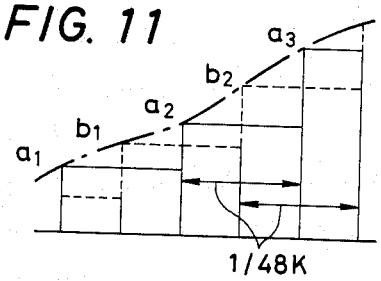
FIG. 11 is a typical waveform chart of the output signal.

FIG. 10 shows another embodiment of the PCM decoder 12. According to this embodiment, there are two systems of respective D/A converters 52A and 52B, each actuated by the 48 kHz clock. The outputs of the D/A converters 52A and 52B are supplied to a sample and hold circuit 54 and the output therof is sent to the low-pass filter 53. The 48 kHz clock supplied to the D/A converter 52A is 180-degrees delayed by a delay circuit 55 but is directly supplied to the D/A converter 52B. Moreover, the undelayed clock and the 180-degrees delayed clock are supplied to the sample and hold circuit 54 for the respective digitized signals. The digital playback signal from the area A is converted by the D/A converter 52A into an analog signal (shown by a solid line in FIG. 11), whereas the digital playback signal from the area B is converted by the D/A converter 52B into an analog signal (shown by a broken line in FIG. 11). These converted analog signals are supplied to the sample and hold circuit 54. The sample and hold circuit 54 successively holds, for example, the levels of $a_1$, $a_2$, $a_3$ of the output of the D/A converter 52A with the undelayed clock and also the levels $b_1$, $b_2$ of the output of the D/A converter 52B correspondingly to the delayed clock. The output thus combined is smoothed by the low-pass filter 53, so that the original signal (shown by an alternately long and short dash line in FIG. 11) is played back.

The systems of encoders or decoders of 48 kHz thus provided make substantially possible the playback of the sampling signal of 96 kHz without providing a 96 kHz clock and its encoder or decoder. It is, needless to say, possible to play back the sampling signal of 48 kHz, provided that the signal thus encoded by the encoder and recorded in the area A or B on an area basis is decoded by the 48 kHz decoder.

In the magnetic recording playback thus constructed according to the present invention, each track is formed in such a manner as to tilt in the longitudinal direction of the magnetic tape and is divided into a plurality of areas. The analog signal is sampled at a clock rate of substantially a frequency Nf. Data sampled every Nth clock pulses is recorded as a group of data in the corresponding area so that a high-definition audio signal can be enjoyed using a recording playback actuated with a higher frequency clock. In addition, the recording signal can be played back using a recording playback actuated with a lower frequency clock.

In the magnetic recording playback of the present invention, a digital signal is recorded on and played back from a recording medium by converting the analog signal to a digital signal. Two systems of encoders or decoders are actuated with a clock of the same frequency. The clock phase driving one encoder or decoder and that driving the other encoder or decoder are put 180-degrees out of phase with each other. Thereby a high-fidelity audio signal can be enjoyed using a recording playback actuated with a lower frequency clock.

In the magnetic recording playback according to the present invention, each track formed by the rotary magnetic head in such a manner as to tilt in the longitudinal direction of the magnetic tape is divided into four areas. The audio signal, composed of the left and right stereo signals and the other two signals, is sampled at the fixed frequency clock to provide digital signals. The left and right digital signals are recorded in at least one of the areas, whereas the other two digital signals are recorded in at least one of the remaining areas. Accordingly, in the 8 mm video tape recorder, high-definition 2-channel and 4-channel audio signal can be recorded on and played back from the magnetic tape without loss of efficiency and the magnetic tape processed by a recording playback capable of 4-channel signal recording and playback becomes usable for playback by a recording playback of only 2-channel signal recording and playback.

The magnetic recording playback is arranged according to the present invention so that each track is formed by the rotary magnetic head in such a manner as to tilt in the longitudinal direction of the magnetic tape. Each track is divided into a plurality of areas so that, when the analog signal is sampled at the frequency 2f to provide the digital signal, the data sampled with the odd number clock are recorded as a group in one of the areas and the data sampled with the even number clock are recorded as a group in one of the remaining areas. Further, when the analog signal is sampled at the frequency f to provide the digital signal, the data sampled at the freqency f are recorded as a group in the area corresponding to what is used for recording the data sampled with the odd or even number frequency 2f clock. Accordingly, a high definition audio signal can be enjoyed using a recording playback actuated with a higher frequency clock and the recorded signal can also be played back using a recording playback actuated with a lower frequency clock.

According to the present invention, in the magnetic recording playback for recording and playing back information by winding the magnetic tape over 180-degrees on the rotary drum which has two rotary magnetic heads positioned 180-degrees apart from each other, each track is formed in such a manner as to tilt in the longitudinal direction of the magnetic tape and is divided into four areas. The analog signal is sampled with the fixed frequency clock to provide the digital signal and when the digital signal is recorded in an area, the two outer areas of the four are treated as a pair, whereas the two inner areas thereof are treated as a pair. Consequently, a higher-definition audio signal can be enjoyed using the 8 mm video tape recorder and, when the signal played back by one of the rotary magnetic heads is recorded on the other (for after-recording), accurate recording becomes possible because not only noise but also error can be minimized.

Also according to a generalization of the invention, in the magnetic recording playback for recording and playing back information by winding the magnetic tape over 180-degrees on the rotary drum having two rotary magnetic heads positioned 180-degrees apart from each other, each track is formed in such a manner as to tilt in the longitudinal direction of the magnetic tape and is divided into a plurality of areas. The analog signal is sampled with the fixed frequency clock to provide the digital signal, which is then recorded in an area. When the digital signal recorded in one of the areas is played back and recorded in another area, the playback of the signal recorded therein is started with the innermost area and the recording thereof is started with the outermost area. Consequently, a higher-definition audio signal can be enjoyed using the 8 mm video tape recorder and, when the signal played back by one of the rotary magnetic heads is recorded on the other (for after-recording), accurate recording becomes possible because not only noise but also errors can be minimized.

In the magnetic recording playback, each track is formed by the rotary magnetic head rotated at a first speed in such a manner as to tilt in the longitudinal direction of the magnetic tape. Each track is divided into first and second portions. At least the first portion is further divided into the portion a for recording the clock signal, the portion b for recording data such as the PCM audio signal, the margin c for after-recording and the video overlap for continuously storing the video signals in the immediately preceding field. The PCM audio or video signal is recorded in the first or second portion by frequency-superposing the tracking pilot signal thereon or is played back from these portions. The track formed by the rotary magnetic head rotated at a speed higher than the first speed in such a manner as to tilt in the longitudinal direction of the magnetic tape is also provided with: a third portion for recording the first code signal; a fourth portion for recording the tracking control signal; a fifth portion for recording the PCM audio signal; a sixth portion for recording the tracking control signal; a seventh portion for recording the second code signal; an eighth portion for recording the third code signal which has a number of blocks equal to those in the third portion corresponding to the system for recording and playing back the data having the fixed number of blocks in and from each of the third through seventh portions; a ninth portion for recording the PCM audio signal having a number of blocks equal in number to the fifth portion; and a tenth portion for recording the fourth code signal having blocks equal in number to the seventh portion. The rotation of rotary magnetic head is switched from the first to second speed. The tilted track composed of the first and second portions is divided into four areas. The data formed of the eighth, ninth and the tenth portions is recorded on and played back from the four areas. Accordingly, not only a video signal but also a high fidelity (Hi Fi) audio signal can be recorded and played back using the so-called 8 mm video tape recorder.

What is claimed:

1. A magnetic recording playback, comprising:
   a rotary magnetic head;
   a magnetic tape wound at an angle on said rotary magnetic head wherein said rotary magnetic head records on said tape tape tracks tilted in a longitudinal direction of said tape; and
   means for switching a rotation of said rotary magnetic head between a first speed and a second speed;
   wherein each said track formed by said magnetic head rotating at said first speed comprises a first section and a second section and at least said first section comprises a first portion for recording a clock signal, a second portion for recording a first digital audio signal, a third portion being a margin for after-recording and a fourth portion being a video overlap for continuously recording video signals in an immediately preceding field;
   wherein each said track formed by said magnetic head rotating at said second speed higher than said first speed comprises a third section for recording a first code signal, a fourth section for recording a tracking control signal, a fifth section for recording a second digital audio signal, a sixth section for recording a tracking control signal, a seventh section for recording a second code signal, an eighth section for recording a third code signal having blocks equal in number to a number of blocks in said third section corresponding to another system for recording and playing back data having a fixed number of blocks in and form said third through seventh sections, a ninth section for recording blocks equal in number to said fifth section and a tenth section for recording a fourth code signal having blocks equal in number to said seventh section; and
   wherein each said track composed of said first and second sections is divided into four areas;
   said playback further comprising:
   means for recording or playing back said first digital audio signal in said first section nor said video signal in said third section by frequency-superposing a tracking pilot signal on said first or second section respectively; and
   means for frequency-superposing first data of said eighth, ninth and tenth sections on said pilot signal and recording and playing back said first data in and from said four areas.

2. A magnetic playback as recited in claim 1, further comprising:
   means to regulate a travel speed of said magnetic tape to half of a reference speed when said rotary head is rotating at said first speed; and
   a PAL system for recording and playing back said video signal in and from said first and second sections.

3. A magnetic playback as recited in claim 1, further comprising sampling means for sampling an analog audio signal to produce said first digital audio signal at a sample-rate twice as high as said second digital audio signal and wherein said recording means records said first digital audio signal in only two of said areas.

4. A magnetic playback as recited in claim 2, further comprising sampling means for sampling an analog audio signal to produce said first digital audio signal at a sample-rate twice as high as said second digital audio signal and wherein said recording means records said first digital audio signal in only two of said areas.

5. A magnetic playback as recited in claim 1, further comprising sampling means for sampling an analog audio signal to produce said first digital audio signal at a sampling rate four times as high as said second audio signal and wherein said recording means records said first digital audio signal in all said four areas.

6. A magnetic playback as recited in claim 2, further comprising sampling means for sampling an analog audio signal to produce said first digital audio signal at a sampling rate four times as high as said second digital audio signal and wherein said recording means records said first digital audio signal in all said four areas.

7. A magnetic playback as recited in claim 1, wherein said analog audio signal comprises left and right channel audio signals and wherein said recording means records digital left and right channel audio signals in one of said areas.

8. A magnetic playback as recited in claim 2, wherein said analog audio signal comprises left and right channel audio signals and wherein said recording means records digital left and right channel audio signals in one of said areas.

9. A magnetic playback as recited in claim 3, wherein said analog audio signal comprises left and right channel audio signals and wherein said recording means records digital left and right channel audio signals in one of said areas.

10. A magnetic playback as recited in claim 5, wherein said analog audio signal comprises left and right channel audio signals and wherein said recording means records digital left and right channel audio signals in one of said areas.

11. A magnetic playback as recited in claim 2, wherein said pilot frequency has the same frequency as a pilot signal used by said recording or playing back means in recording said first digital audio signal and said video signal in and from said first and second sections through said PAL system.

* * * * *